(12) United States Patent
Lee et al.

(10) Patent No.: US 7,853,102 B2
(45) Date of Patent: Dec. 14, 2010

(54) POLYMER WAVELENGTH FILTERS WITH HIGH-RESOLUTION PERIODICAL STRUCTURES AND ITS FABRICATION USING REPLICATION PROCESS

(75) Inventors: Kun-Yi Lee, Taichung (TW);
Wei-Ching Chuang, Taichung (TW);
Kuen-Cherng Lin, Taichung (TW);
Cheng-Che Lee, Taichung (TW);
Wei-Yu Lee, Taichung (TW)

(73) Assignee: China Institute of Technology, Taipei (TW)

( * ) Notice: Subject to any disclaimer, the term of this patent is extended or adjusted under 35 U.S.C. 154(b) by 345 days.

(21) Appl. No.: 11/945,973

(22) Filed: Nov. 27, 2007

(65) Prior Publication Data

US 2009/0136180 A1    May 28, 2009

(51) Int. Cl.
*G02B 6/34* (2006.01)
(52) U.S. Cl. .................................................. 385/37
(58) Field of Classification Search .................... 385/37
See application file for complete search history.

(56) References Cited

U.S. PATENT DOCUMENTS 7,625,515 B2 * 12/2009 Lee et al. ................ 264/496

OTHER PUBLICATIONS

Chuang, Wei-Ching, Fabrication of high-resolution periodical structures on polymer waveguides using a replication process, Jul. 9, 2007, Optics Express, vol. 15 No. 14, pp. 8649-8659.*
Wei-Ching Chuang et al.,; Fabrication of high-resolution periodical structures on polmer waveguides using a replication process; Journal; Jun. 26, 2007; pp. 8649-8659; vol. 15, No. 14; Optics Express; Optical Society of America.

* cited by examiner

*Primary Examiner*—Uyen-Chau N Le
*Assistant Examiner*—Hoang Tran
(74) *Attorney, Agent, or Firm*—WPAT, P.C.; Anthony King (57) ABSTRACT

The present invention discloses a method for fabricating polymer wavelength filter with high-resolution periodical structure, which comprises: a positive photo-resister film is coated or a substrate, holographically exposed with grating pattern, and coated with a negative photo-resister film, then exposed by UV light and developed to obtain a waveguide mold having negative waveguide; a PDMS film coated on the waveguide mold, baked and peeled off to obtain a PDMS mold; a first tunnel formed over the PDMS mold, injected with a first UV polymer, then cured and separated the first UV polymer having groove to be the cladding layer of the polymer wavelength filter; a second UV polymer injected into the groove of the cladding layer, and cured to form the core of the waveguide in the groove of the cladding layer to finally be the polymer wavelength filter.

19 Claims, 6 Drawing Sheets

POLYMER WAVELENGTH FILTERS WITH HIGH-RESOLUTION PERIODICAL STRUCTURES AND ITS FABRICATION USING REPLICATION PROCESS

FIELD OF THE INVENTION

The present invention relates to a method for fabricating polymer wavelength filter with high-resolution periodical structure, especially to a technique that combines the holographic interferometry, soft lithography, and a simple replication processes to create a high resolution and high aspect ratio grating structure on a polymer waveguide.

BACKGROUND OF THE INVENTION

Optical grating filters in guided-wave optics have been extensively investigated, because they are essential for applications in wavelength division multiplexing systems. When surface-relief gratings are inscribed on waveguides, the grating-waveguides can act as filters to select particular signals from many arriving signals. The desired characteristics of the filter can be achieved by the selection of parameters of the waveguide and the grating. For optical filter applications, high-resolution and high aspect ratio grating fabrication is important because they impact the filtering characteristics and compact size of the devices. Polymeric optical devices are widely used in guided-wave optics owing to their low cost and simple fabrication process. Realization of Bragg gratings in polymer waveguides has attracted much attention in optical communications and optical sensing systems. Typical techniques for patterning gratings on polymer films include holographic lithography (refer to the papers: D. Y. Kim, S. K. Tripathy, L. Li, and J. Kumar, "Laser-induced holographic surface relief gratings on nonlinear optical polymer films," Appl. Phys. Lett. 66, 1166-1168 (1995); J. W. Kang, M. J. Kim, J. P. Kim, S. J. Yoo, J. S. Lee, D. Y. Kim, and J. J. Kim, "Polymeric wavelength filters fabricated using holographic surface relief gratings on azobenzene-containing polymer films," Appl. Phys. Lett. 82, 3823-3825 (2003); and S. Aramaki, G. Assanto, G. I. Stegeman, and M. Marciniak, "Realization of integrated Bragg reflectors in DANs-polymer waveguides," J. Lightwave Technol. 11, 189-1195 (1993).), electron-beam (e-beam) lithography (refer to the paper: H. Nishihara, Y. Handa, T. Suhara, and J. Koyama, "Electron-beam directly written micro gratings for integrated optical circuits," in Photo- and Electro-Optics in Range Instrumentation, J. Water, et al., eds., Proc. SPIE, 134, 152-159 (1980).), laser beam direct writing (refer to the paper: L. Eldada, C. Xu, K. M. T. Stengel, L. W. Shacklette, and J. T. Yardley, "Laser-fabricated low loss single-mode raised-rib waveguiding devices in polymers," J. Lightwave Technol. 14, 1704-1713 (1996).), and phase mask lithography (refer to the papers: L. Eldada, S. Yin, C. Poga, C. Glass, R. Blomquist, and R. A. Norwood, "Integrated multichannel OADMS using polymer Bragg grating MZIS," IEEE, Photonics Technol. Lett. 10, 1416-1418 (1998); and L. Eldada, R. Blomquist, M. Maxfield, D. Pant, G. Boudoughian, C. Poga, and R. A. Norwood, "Thermooptic planar polymer Bragg grating OADM's with broad tuning range," IEEE Photonics Technol. Lett. 11, 448-450 (1999).). However, few researchers have focused on fabricating surface-relief grating on tunnel waveguides. It has recently been shown that surface-relief gratings can be simply transferred to polymer waveguides by $O_2$ reactive ion etching using azobenzene polymers as the etching mask. But, for these techniques surface scattering loss is often induced due to the surface roughness caused by the physical etching process, and high aspect ratio of the grating patterns is not easy to be obtained by this process (refer to the papers: B. Darracq, F. Chaput, K. Lahlit, Y. Levy, and J.-P. Boilot, "Photoinscription of surface relief grating on azo-hybrid gels," Advanced Materials 10, 1133-1136 (1998); and D. J. Kang, J. K. Kim, and B. S. Bae, "Simple fabrication of diffraction gratings by two beam interference method in highly photosensitivity hybrid sol-gel films," Opt. Express 12, 3947-3953 (2004))). The electron-beam direct-writing method has been used to inscribe the polymeric ridge waveguide with a corrugated sidewall Bragg grating (refer to the paper: L. Zhu, Y. Huang, W. M. J. Green, and A. Yariv, "Polymetric multi-channel bandpass filters in phase-shifted Bragg waveguide gratings by direct electron beam writing," Opt. Express 12, 6372-6376 (2004)). This design is superior to the conventional buried grating for controlling the effective index modulation. It also showed good transmission dip for very short grating length. However, the core size must be very small to have the single mode condition, since the core index of their waveguide is much larger than the surrounding cladding index. This condition will cause the coupling difficulty between the waveguides and ordinary fibers. Ahn et al fabricated Bragg grating filters using the nanoimprint technique (refer to the papers: D.-H. Kim, W.-J. Chin, S.-S. Lee, S.-W. Ahn, and K.-D. Lee, "Tunable polymeric Bragg grating filter using nanoimprint technique," Appl. Phys. Lett. 88, 071120, (2006)). In their approach, they fabricated a UV transparent quartz stamp and using a nanoimprint machine to successfully transfer the grating pattern onto the polymer layer. The process is cost effective and results in simplicity to fabricate a stamp. But, there are some drawbacks that have been explicitly mentioned in Ref. 19. These drawbacks may restrict the use of this method in fabricating a Bragg grating filter. Kocabas et al reported the fabrication of a grating on OG 146 polymer using e-beam direct writing and stamp transfer techniques (refer to the paper: A. Kocabas and A. Aydinli, "Polymeric waveguide Bragg grating filter using soft lithography," Opt. Express 14, 10228-10232 (2006)). Then, a BCB polymeric ridge waveguide was fabricated on the grating using reaction ion etching technique. The grating fabrication process is similar to our previous work except for the e-beam writing technique (refer to the paper: W. C. Chuang, C. T. Ho, and W. C. Wang, "Fabrication of a high resolution periodical structure using a replication process" Opt. Express 13, 6685-6692 (2005)). The experimental results showed good replication for the grating through the process. However, the physical etching process may cause large scattering losses from the sidewall of waveguides.

We have recently demonstrated a process to rapidly produce submicron range gratings by using both micro-molding and holographic interference techniques. A large aspect ratio of 0.7:1 between the depth and the period on the grating pattern could be obtained, and consistent reproduction of the grating on a UV polymer could be achieved with this process (refer to the paper: W. C. Chuang, C. T. Ho, and W. C. Wang, "Fabrication of a high resolution periodical structure using a replication process" Opt. Express 13, 6685-6692 (2005)). In this paper, we demonstrate a method to inscribe surface-relief gratings on polymer tunnel waveguides without any physical etching process.

There are a number of simple methods to fabricate polymer waveguides that include techniques involving photo-crosslinking (refer to the paper: Jae Wook Kang, Jang-Joo Kim, Jinkyu Kim, Xiangdan Li, Myong-Hoon Lee, "Low-loss and thermally stable TE-mode selective polymer waveguide using photosensitive fluorinated polyimide", IEEE Photonics Technol. Lett. 14, 1297-1299 (2002)), photobleaching (refer to the papers: T. E. Van Eck, A. J. Ticknor, R. S. Lytel, and G. F. Lipscomb, "Complementary optical tap fabricated in an electro-optic polymer waveguide", Appl. Phys. Lett. 58, 1588-1590, (1991); and O. Watanabe, M. Tsuchimori, "Improvement in linear and nonlinear optical-properties by blending poly(N-vinyl-2-pyrrolidone) with an electro-optic polymer", Polymer 42, 6447-6451 (2001)), reactive ion etching (refer to the papers: M. Hikita, Y. Shuto, M. Amano, R. Yoshimura, S. Tomaru, and H. Kozawaguchi, "Optical intensity modulation in a vertically stacked coupler incorporating electro-optic polymer", Appl. Phys. Lett. 63, 1161-1163 (1993); and W. Wang, D. Chen, and H. R. Fetterman, "Travelling wave electro-optic phase modulator using cross-linked nonlinear optical polymer", Appl. Phys. Lett. 65, 929-931 (1994)), photolocking (refer to the paper: B. L. Booth, "Low loss channel waveguides in polymers", J. Lightware Technol. 7, 1445-1453 (1989)) and laser/electron beam writing (refer to the papers: L. Eldada and L. W. Shacklette, "Advances in polymer integrated optics", IEEE J. Select. Topics Quantum Electron 6, 54-68 (2000); and Y. Y. Maruo, S. Sasaki, and T. Tamamura, "Embedded channel polyimide waveguide fabrication by direct electron beam writing method", J. Lightwave Technol 13, 1718-1723 (1995)). Some techniques have inherent limitations; for example reactive ion etching can incur excessive scattering losses (refer to the papers: M. Hikita, Y. Shuto, M. Amano, R. Yoshimura, S. Tomaru, and H. Kozawaguchi, "Optical intensity modulation in a vertically stacked coupler incorporating electro-optic polymer", Appl. Phys. Lett. 63, 1161-1163 (1993); and W. Wang, D. Chen, and H. R. Fetterman, "Travelling wave electro-optic phase modulator using cross-linked nonlinear optical polymer", Appl. Phys. Lett. 65, 929-931 (1994)), and laser beam writing is not suitable for mass-production (refer to the paper: L. Eldada and L. W. Shacklette, "Advances in polymer integrated optics", IEEE J. Select. Topics Quantum Electron 6, 54-68 (2000)). Other techniques such as hot embossing (refer to the paper: Holger Becker and Wolfram Dietz, "Microfluidic devices for TAS applications fabricated by polymer hot embossing," in Microfluid Devices and Systems, A. B. Frazier and C. H. Ahn, eds., Proc. SPIE 3515, 177-181 (1998)), UV-embossing (refer to the paper: P. M. Ferm and L. W. Shacklette, "High volume manufacturing of polymer waveguides via UV-Embossing," in Linear, Nonlinear, and Power-Limiting Organics, E. Manfred, et al., eds., Proc. SPIE 4106, 1-10 (2000)), and micro-transfer molding method are also becoming more popular due to their simple fabrication procedure (refer to the papers: K. E. Paul, T. L. Breen, J. Aizenberg, and G. M. Whitesides, "Maskless Photolithography: embossed photo-resister as its own optical element," Appl. Phys. Lett. 73, 2893-2895 (1998); and X.-M. Zhao, S. P-Smith, S. J. Waldman, G. M. Whitesides, and M. Prentiss, "Demonstration of waveguide couplers fabricated using microtransfer molding," Appl. Phys. Lett. 71, 1017-1019 (1997)). However, these methods have problems to overcome; such as residual material problems and limited substrate and core materials available.

SUMMARY OF THE INVENTION

It is therefore a primary object of the present invention to develop a soft lithography method to replicate polymer waveguides. In this method, the waveguides are produced by a two-step molding process where a master mold is first formed on a negative tone photo-resister and subsequently transferred to a PDMS mold. The silicone rubber mold is then used as a stamp to transfer the final waveguide pattern onto a UV curing epoxy. High aspect ratio (depth/width) and vertical waveguide sidewalls could be obtained by this method.

DETAILED DESCRIPTION OF THE PREFERRED EMBODIMENT

Refer to the FIGS. 1, 2 and 4(a) to (n), the present invention discloses a method for fabrication polymer waveguide filters with high-resolution periodical structures.

I. Grating Fabrication of the Present Invention

Figure 1:
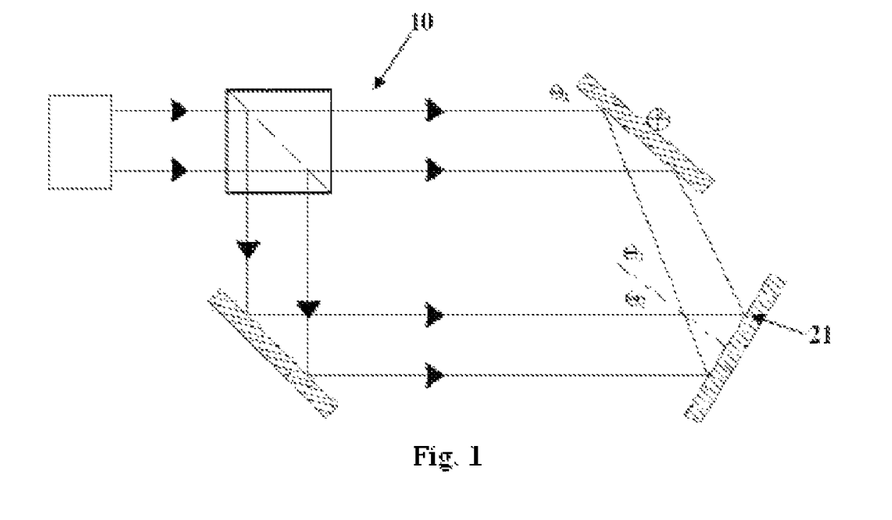
FIG. 1 is a holographic interferometric apparatus used by the present invention.
Figure 2:
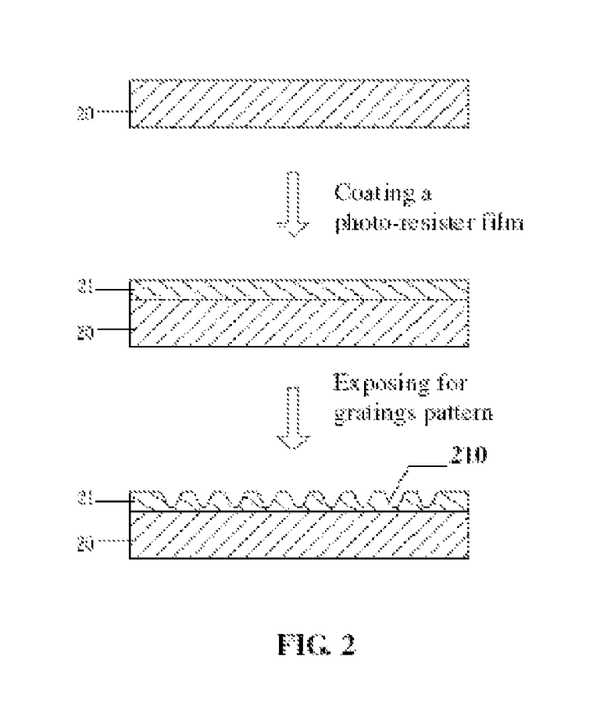
FIG. 2 shows a grating fabrication process in accordance with the present invention.
Figure 3A:
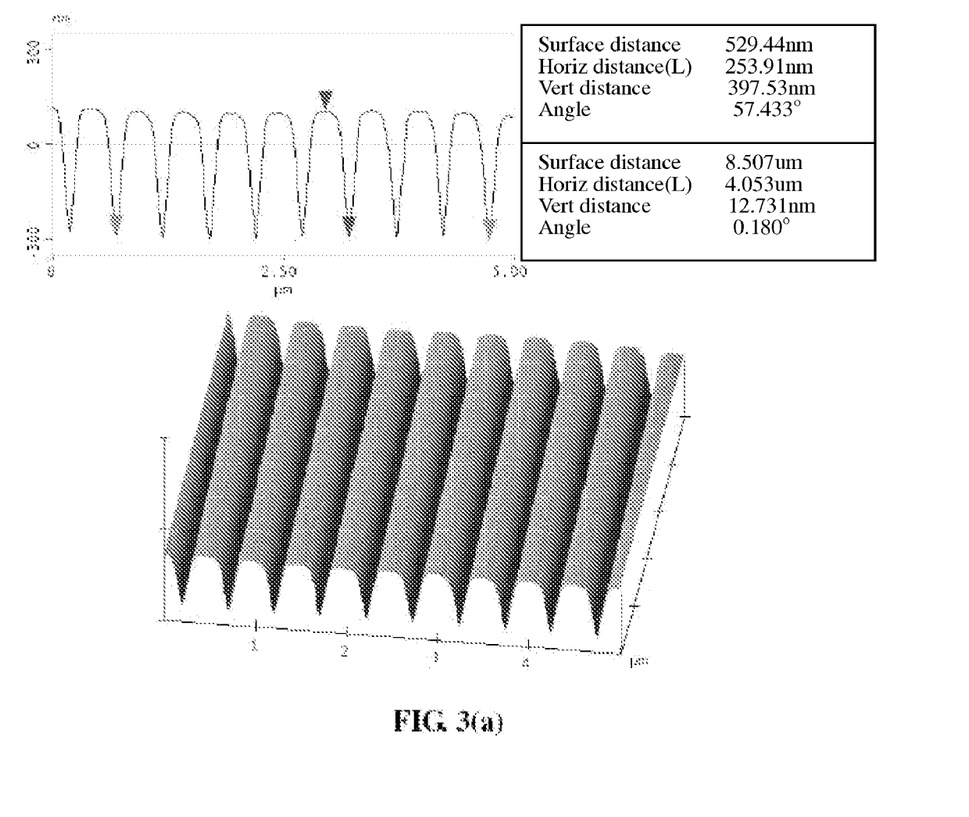
FIG. 3(a) shows the AFM micrographs of gratings on UV polymer in accordance with the present invention (503 nm grating period and 397 nm grating depth)
Figure 3B:
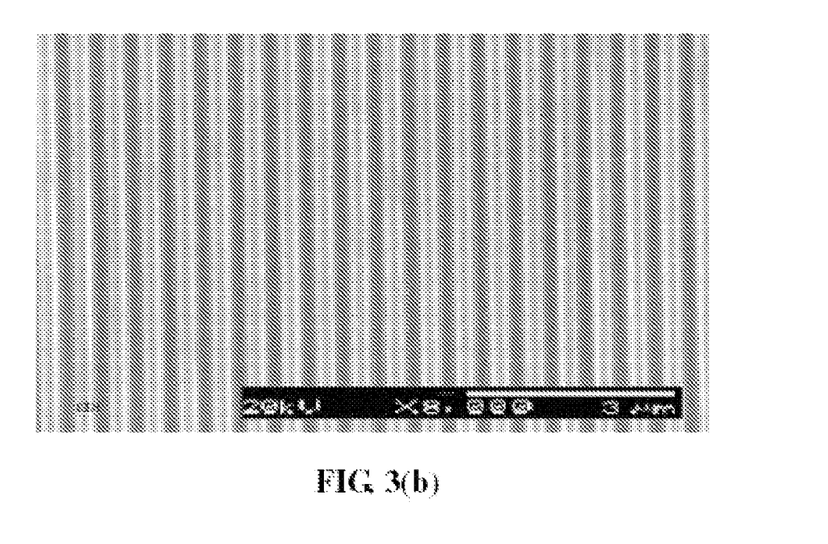
FIG. 3(b) shows the SEM micrographs of gratings on UV polymer in accordance with the present invention (503 nm grating period and 397 nm grating depth)

The fabrication method of the present invention, rapid prototyping of grating structures on a polymer film, involves a three-step process performed firstly. Referring to FIGS. 1 and 2, a positive photo-resister film 21 is coated on a substrate 20 by using a spin coater, wherein, the spin condition is 3000 rpm for 20 seconds and the thickness of the photo-resister film 21 is about 0.45 µm, and the substrate 20 could be a glasses substrate. A grating pattern 210 is holographically exposed on the positive photo-resister film 21 by using a holographic interferometric apparatus 10 to produce a two-beam interference pattern (wherein, the photo-resister used in the invention is Ultra 123 made by MicroChem Corp., MA., whose refractive index is 1.618). This produces a master of photo-resister mold with the grating pattern 221 that can be subsequently used to produce a polydimethylsiloxane (PDMS) mold with a grating pattern which transferred from the master. This silicone rubber mold (i.e. polydimethylsiloxane mold) then is used as a stamp to transfer the gratings pattern onto an ultraviolet ("UV") cure epoxy polymer (UV polymer). Based on our results, we found that the grating period and the corresponding depth of the grating pattern can be accurately controlled down to less than 1% error. We also found that a high aspect ratio of almost 0.7:1 between the depth and the period of the grating structure could be obtained using this process. FIGS. 3(a) and 3(b) respectively showing the AFM and SEM results of photo-resister mold with a grating period of 503 nm and a grating depth of 397 nm, which was fabricated by the above process. The UV polymer with grating was cut down to 1 cm×5 cm, and the dimensions of the gratings on UV polymer were 0.5 cm long and 1 mm wide.

II. Fabrication of the Polymeric Wavelength Filter

Figure 4:
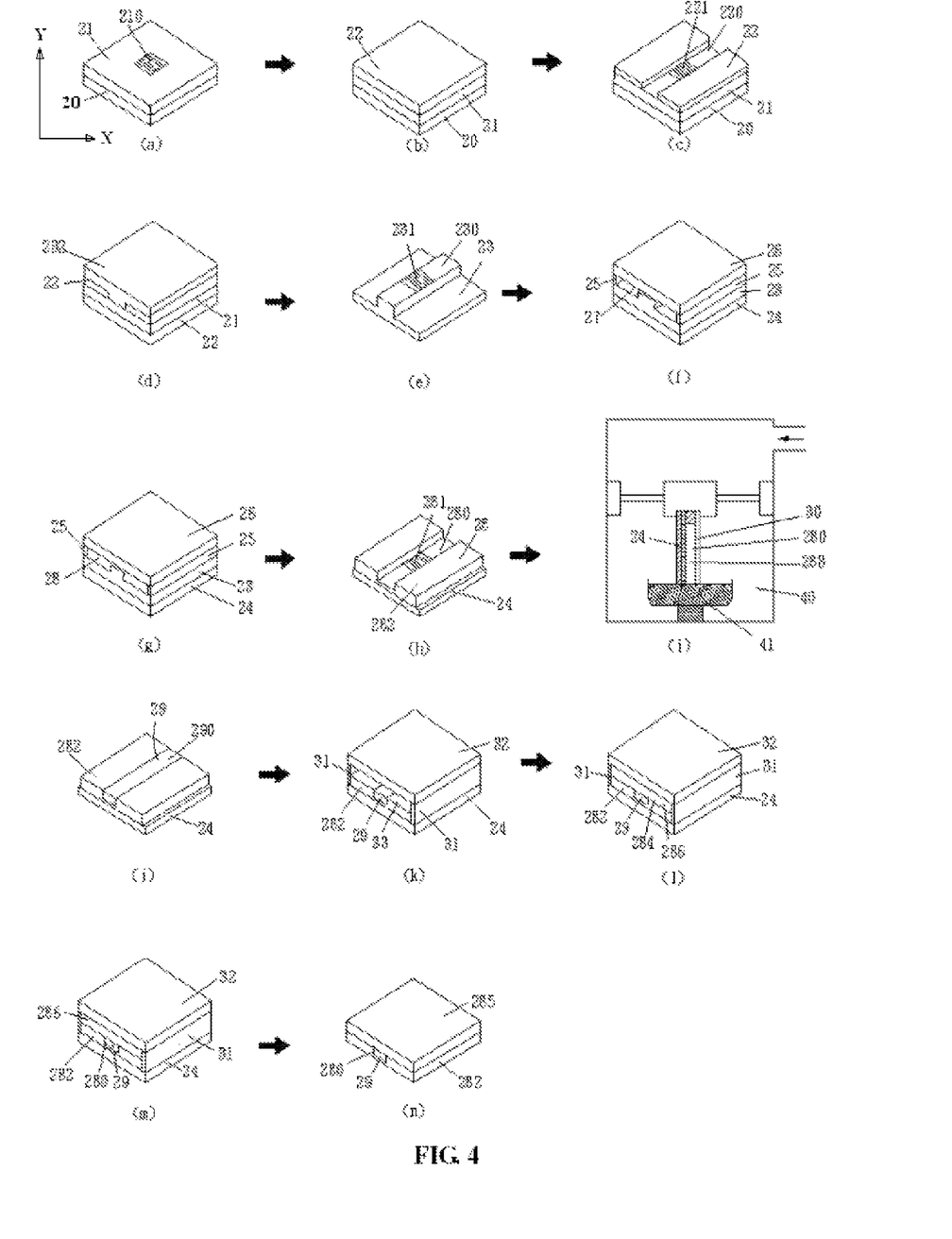
FIG. 4 shows the fabrication process of buried gratings in polymeric waveguide filter structures in accordance with the present invention.
Figure 5:
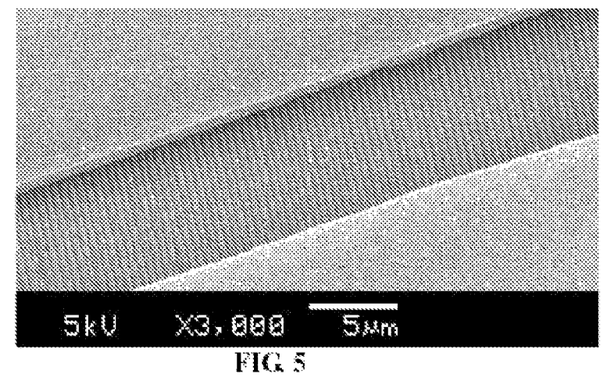
FIG. 5 SEM micrograph of the waveguide pattern on photo-resister in accordance with the present invention, which showed the intact grating pattern inside the groove, and SEM was tilted 55° degree (the dimension is 8.7 µm×6 µm, the length is 5 cm, and the grating period is 503 nm)

Referring to FIG. 4, in the present invention, in order to fabricate a polymer wavelength filter, a 700 μm thick glass substrate was first cut into a 5 cm×1 cm rectangle. After the glass substrate cleaning, the photo-resister 21 with grating pattern was on the glass substrate 20, and it was coated with a 6.0 μm thick negative photo-resister 22 (SU-8) spun on at 100 rpm spin for 17 seconds be a first sample. The first sample on the glass substrate 20 with the negative photo-resister were exposed by UV light through the PET (Polyethylene Terephthalate)-based masks using a UV mask aligner (AB-Manufacturing, CA) for 90 seconds, followed by developing in a SU-8 developer (MicroChem) for 45 seconds, and a negative waveguide pattern 220 with gratings 221 on the bottom were obtained for being a waveguide mold. The process flow is shown in FIGS. 4(a) and 4(b). The negative waveguide dimension is about 8.7 μm×6.0 μm, and the length is about 5 cm. FIG. 5 is the SEM image of the waveguide mold (i.e. the photo-resister mold), which shows the intact grating pattern inside the groove.

Figure 6:
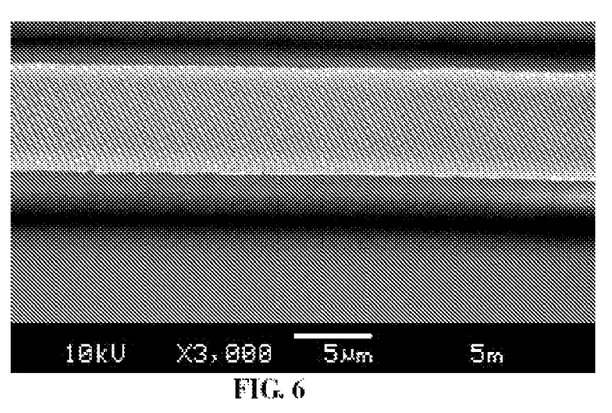
FIG. 6 shows SEM micrograph of the PDMS waveguide with gratings in accordance with the present invention, and SEM was tilted 35° Degree (the dimension is 8.7 µm×6 µm, the length is 5 cm, and the grating period is 502 nm)

The patterned photo-resister mold was used as a mother mold to transfer the grating pattern onto a polydimethylsiloxane (PDMS) thin film using typical micro-molding technique (e.g. stamping). The diluted PDMS film 232 was uniformly coated on the patterned waveguide mold (i.e. the photo-resister mold). After baking at 90° C. for 1 hr, the PDMS film 232 was cured and could be easily peeled off from the waveguide mold (i.e. the photo-resister mold) to be a PDMS mold 23 with waveguide 230 having gratings pattern 231 (referring to FIG. 4(c) to 4(e)). FIG. 6 shows the SEM image of the waveguide with gratings on the PDMS mold 23.

Figure 7:
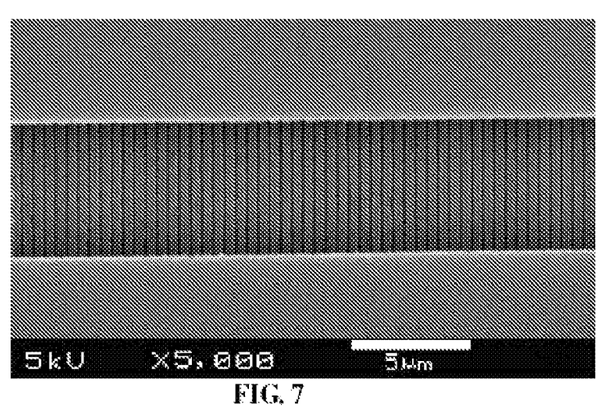
FIG. 7 shows the SEM micrograph of the OG146 rectangular groove in accordance with the present invention, which showed the intact grating pattern inside the groove, and SEM was tilted 5° degree (the dimension is 8.7 µm×6 µm, the length is 5 cm, and the grating period is 503 nm)

Referring to FIG. 4(f) to 4(h), the waveguide with the gratings pattern is transferred onto a first UV polymer (OG146) from the PDMS mold 23 using a UV replication process. The PDMS mold 23 was put on a glass substrate 24. A spacer 25 with a thickness of 400 μm was placed between the PDMS mold and a thin Pyrex glass slide 26 to form a first tunnel 27. After injection of a precure first UV polymer 28 into the first tunnel 27 (wherein, the embodiment of the first UV polymer in the present invention is OG146 epoxy), the first UV polymer 28 (OG146 epoxy) was then cured under a broadband UV light operating in a wavelength range of 300-400 nm. After the first UV polymer 28 was fully cured, the first UV polymer 28 was easily peeled off from the PDMS mold 23. Referring to FIG. 7, the SEM image shows that the replication on first UV polymer (OG146 epoxy) was good, and had good matching in dimension to the negative photo-resister mold. After separating from the PDMS mold 23, a hardened first UV polymer 28 (OG146 epoxy) is formed having a groove 280 with gratings pattern 281 at its bottom, and the first UV polymer is to form the cladding layer 282 of the polymer wavelength filter.

Referring to FIG. 4(i) to 4(j), a second UV polymer is used to form the waveguide core 29. In the present invention, the second UV polymer 290 is a similar UV polymer with the first UV polymer 28, and which is injected into the groove 280 of the first UV polymer 28 to form the core 29. Instead of spin coating technique, which could create a thick unguided layer outside the waveguide core region that would results in some coupling loss during the input of the optical fiber to the filter, another method was also proposed. A thin layer of a polydimethylsiloxane (PDMS) polymer is spun onto a glass slide 30, and the glass slide 30 is then placed over the groove 280 of the first UV polymer 28 to form a rectangular tunnel 283. In one embodiment of the present invention, the second UV polymer 290 mainly comprises OG154 epoxy. In order to inject a high viscosity OG154 epoxy into the groove 280 of the first UV polymer 28 (i.e. the rectangular tunnel 283), the OG154 epoxy is diluted with a third UV polymer to be a mixed UV polymer to reduce the viscosity of the OG154 epoxy. In one embodiment of the present invention, the third UV polymer is OG169 epoxy, the mixed UV polymer is a mixed UV epoxy which mixed by OG154 epoxy and OG169 epoxy, and the mixing ratio of OG154 epoxy and OG169 epoxy is 1:1. After the curing process, the refractive index of the mixed UV epoxy is about 1.550 at 1550 nm wavelength.

One embodiment of the process to inject the mixed UV epoxy in to the groove 280 of the first UV polymer 28 (i.e. the rectangular tunnel 283) of the present invention, firstly a drop of the mixed UV epoxy is injected into the groove 280 of the first UV polymer 28 (i.e. the rectangular tunnel 283) from one of the open ends of the groove 280 of the first UV polymer (i.e. the rectangular tunnel 283). After exposing with UV light, the drop of the mixed UV epoxy seals one end of the groove 280 of the first UV polymer 28 (i.e. the rectangular tunnel 283) and remains one open-end. Next, the sample was inserted into the liquid mixed UV epoxy with the open-end face down. This process was performed in a vacuum chamber (FIG. 4(i)). When the pressure in the chamber reached $10^{-4}$ Torr, air was introduced into the chamber to force the liquid mixed epoxy into the groove 280 of the first UV polymer 28 (i.e. the rectangular tunnel 283) via its open-end. The mixed epoxy in the groove 280 of the first UV polymer 28 (i.e. the rectangular tunnel 283) was cured by exposing the UV light for 1-2 minutes. After the cover glass was removed, the PDMS layer was peeled off from the sample (i.e. the cladding layer 282 with core 29). To prevent the optical loss due to either surface scattering losses or the outright absence of a guided mode for the asymmetric waveguide structure, the upper cladding layer 285 was used. The same first UV polymer 286 (OG146 epoxy) was deposited using the fabricating procedure described in the previous section (FIG. 4(k) to 4(n)). A spacer 31 with thickness of 410 μm was placed between the sample and a thin Pyrex glass slide 32 to form a second tunnel 33. After injecting the precure first UV polymer 286 (OG146 epoxy) into the second tunnel 33 between the sample and the glass slide 32, UV light was used to crosslink the first UV polymer 28/286 (i.e. crosslink the cladding layer and the upper cladding layer). The sample were diced and the end-faces were then polished, such that the final polymeric wavelength filter has dimensions of 4 cm in length, 1 cm in width and about 410 μm in thickness (FIG. 4(*n*)).

III. The Structure of the Polymer Wavelength Filter of the Present Invention Refer to FIG. 4(*n*), the present invention discloses a polymer wavelength filter with high-resolution periodical structure comprises:

a cladding layer 282 having a groove 280 with gratings pattern at its bottom, the cladding layer 282 made by a first UV polymer;

a core 29, form in the groove 280 of the cladding layer 282, and made by a second UV polymer; and a upper cladding layer 285 for cover the cladding layer 282 and the core 29, and made by a first UV polymer which is the same with the first UV polymer of the cladding layer 282.

Wherein, the first UV polymer is OG146 epoxy, the second UV polymer is a mixed UV polymer which is mixed by OG154 epoxy and OG169 epoxy with the mixing ratio of 1:1. The refractive index of the mixed UV epoxy is about 1.550 at 1550 nm wavelength. The polymer wavelength filter has dimensions of 4 cm in length, 1 cm in width and about 410 μm in thickness

IV. The Waveguide Properties of the Present Invention

Figures 8, 9:
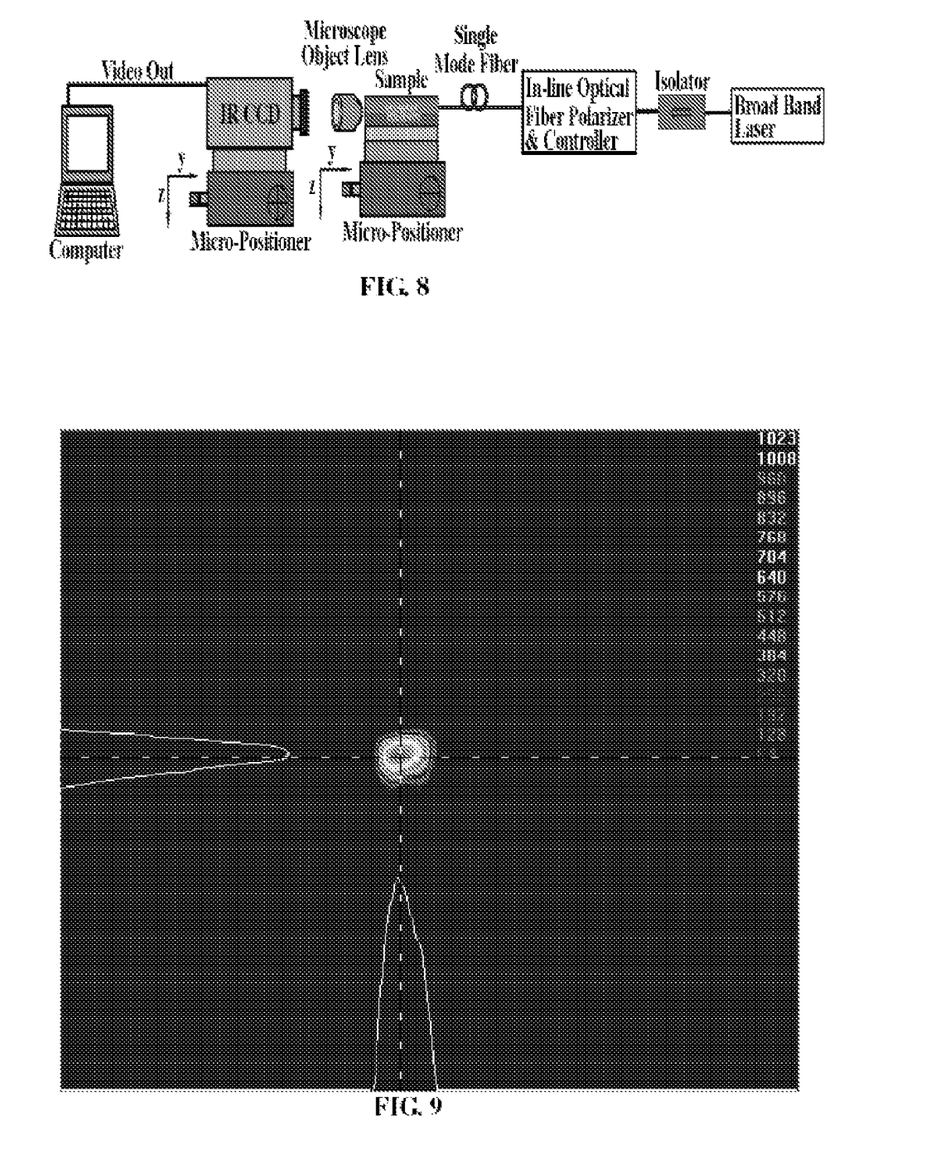
FIG. 8 shows the schematic diagram of the mode field measurement system in accordance with the present invention.
FIG. 9 shows the mode field of the waveguide in accordance with the present invention.

The near field patterns of the optical waveguide were observed using the end-fire coupling technique. FIG. 8 shows the schematic diagram of the measurement system. An amplified spontaneous emission (ASE) source with a wavelength range from 1530 to 1560 nm was used as the wide band light source (Stabilized Light Source, PTS-BBS, Newport Inc., USA). The light source was polarized in the TE direction using the in-line polarizer (ILP-55-N, Advanced Fiber Resources, China), which was followed by a polarization controller with operation wavelength around 1550 nm (F-POL-PC, Newport Inc., USA). The output mode field of the waveguide was observed using an IR CCD system (Model 7290A, Micron Viewer, Electrophysics Inc., U.S.A.) with image analysis software (LBA-710PC-D, V4.17, Spiricon Inc., USA). The measured mode field pattern of the waveguide is depicted in FIG. 9, which show the single-mode characteristics of the waveguide.

Figure 10:
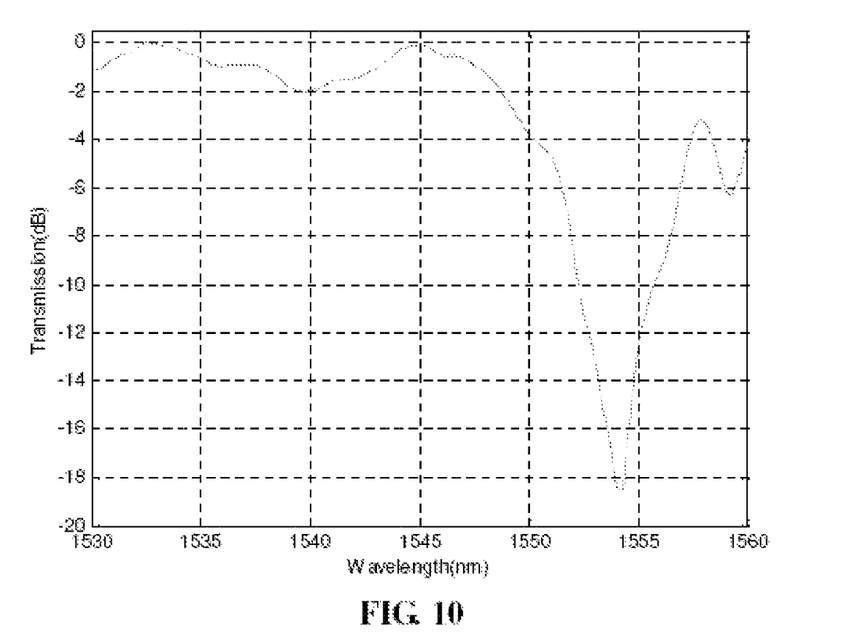
FIG. 10 shows the transmission spectrum of the polymeric wavelength filter with 0.5 cm-long grating length in accordance with the present invention.

The waveguide properties including the mode pattern and the effective index were simulated using the beam propagation method (BPM_CAD, Opti-Wave Inc., Canada). The effective index of the waveguide is 1.5447 from the simulation. The Bragg wavelength is 1553.9 nm as calculated from the Bragg reflection condition. The transmission of the optical filter was also calculated by using coupled mode theory. The calculated transmission minimum of the optical filter is −19.5 dB. The spectral characteristics of the optical filter were measured using an optical spectrum analyzer (Q8384 Optical Spectrum Analyzer, Advantest Inc., Japan). Again, an amplified spontaneous emission (ASE) light source with a wavelength range from 1530 to 1560 nm was used as the wide band light source. An alignment He—Ne laser source, as the auxiliary source, was combined with the wide band source using a 2×1 optical fiber coupler. The optical filter was set on a micro-positioner, and two single mode fibers were used as the input and output fibers. The input light source was polarized in the TE direction as was the mode field measurement system. The output fiber, then, was connected to the optical spectrum analyzer to characterize the filter performance. The measured result is shown in FIG. 10. At the Bragg wavelength, a transmission dip of −18.5 dB was obtained, and the 3-dB-transmission bandwidth was about 8 nm. The result is consistent with the calculation of the coupled mode theory. The Bragg wavelength $\lambda_B$ is given as $\lambda_B = 2N_{eff}\Lambda$, where $N_{eff}$, can be calculated using the beam propagation method, is the effective index of the waveguide grating and $\Lambda$ is the period of grating. The measured Bragg wavelength is 1554.02 nm, which is off by 0.12 nm from the theoretical prediction. When the core refractive index ranges from 1.549 to 1.551 for the ratio of OG154 ranging from 45% to 55%, the calculated Bragg wavelength by the beam propagation method varies from 1552.9 to 1554.8 nm.

V. The Further Application of the Present Invention

Figure 11:
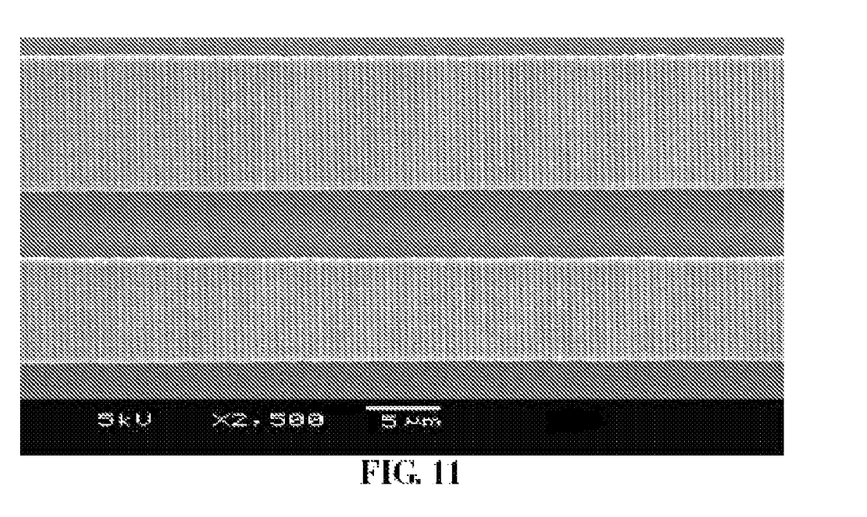
FIG. 11 shows the SEM micrograph of the PDMS mold of ABC waveguide filter in accordance with the present invention (the dimensions of the two asymmetric coupled waveguide are 7.8 µm×6 µm, 11 µm×6 µm, the length is 4 cm, and the gap is about 4 µm).

The technique described in this paper can also be applied to the fabrication of asymmetric Bragg couplers (ABC), which can be utilized as optical add/drop multiplexer (OADM) elements in dense wavelength division multiplexing (DWDM) systems. The possibility of fabricating ABC waveguide filters is illustrated in FIG. 11. The fabrication procedure is the same as the above-mentioned process, and the only difference is the PET-based mask designed. This result shows that parallel polymeric waveguide filters can be possibly designed and fabricated.

VI. Conclusion

In conclusion, we have successfully created a process to rapidly produce submicron range gratings on polymer waveguides by using holographic interference techniques, soft Lithography, and micro molding. A large aspect ratio grating pattern could be obtained with consistent reproduction of the grating on a UV polymer waveguide could be produced. The grating period and depth on the polymer waveguides exhibited only a small difference from the original designed grating pattern. This process shows great potential for mass production of any period of grating structure on waveguide, and could be used to successfully fabricate coupled polymeric waveguide filters.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A method for fabricating the polymer wavelength filter with high-resolution periodical structure comprising following steps:
   (a) a positive photo-resister film being coated on a substrate;
   (b) a grating pattern holographically being exposed using a two-beam interference pattern on the positive photo-resister film;
   (c) the photo-resister film being coated with a negative photo-resister film to be a first sample;
   (d) the first sample being exposed by UV light;
   (e) developing the first sample in a developer to obtain a negative waveguide on the photo-resister film, and the negative waveguide having gratings pattern on its bottom to be a waveguide mold;
   (f) coating a diluted PDMS film on the patterned waveguide mold;

(g) baking the PDMS film to be cured, and peeling off the PDMS film from the waveguide mold to be a PDMS mold with waveguide having gratings pattern;

(h) placing a spacer between the PDMS mold and a thin glass slide to form a first tunnel;

(i) injecting a precure first UV polymer into the first tunnel;

(j) curing the first UV polymer under a broadband UV light;

(k) separating the first UV polymer when fully cured, a hardened first UV polymer being formed having a groove with gratings pattern at its bottom, and the first UV polymer being to form a cladding layer of the polymer wavelength filter;

(l) a thin layer of a polydimethylsiloxane (PDMS) being spun onto a glass slide, and the glass slide being placed over the groove of the first UV polymer;

(m) a second UV polymer being injected into the groove of the first UV polymer; and (n) the second UV polymer being cured by exposing the UV light, and to form the core of the waveguide in the groove of the first UV polymer to finally be the polymer wavelength filter.

2. The method as claimed in claim 1, wherein, in step (a), the positive photo-resister film is coated by using a spin coater, the spin condition is 3000 rpm for 20 seconds.

3. The method as claimed in claim 1, wherein, in step (a), the substrate is a glasses substrate.

4. The method as claimed in claim 1, wherein, in step (b), the refractive index of the photo-resister is 1.618.

5. The method as claimed in claim 1, wherein, in step (c), the coated condition is spin 1000 rpm for 17 seconds.

6. The method as claimed in claim 1, wherein, in step (d), the first sample is exposed by UV light through the PET (Polyethylene Terephthalate)-based masks using a UV mask aligner for 90 seconds.

7. The method as claimed in claim 1, wherein, in step (i), the first UV polymer is OG146 epoxy.

8. The method as claimed in claim 1, wherein, in the step (j), the broadband UV light operates in a wavelength range of 300-400 nm.

9. The method as claimed in claim 1, wherein the step (m) comprises the following steps:

(m1) the second UV polymer being diluted with a third UV polymer to be a mixed UV polymer;

(m2) a drop of the mixed UV polymer being injected into the groove of the first UV polymer from one of the open ends of the groove, then exposing with UV light, the drop of the mixed UV polymer sealing one end of the groove and remaining one open-end; and (m3) then the sample being inserted into the liquid mixed UV polymer with the open-end face down, this process being performed in a vacuum chamber, when the pressure in the chamber reached $10^{-4}$ Torr, air being introduced into the chamber to force the liquid mixed polymer into the groove via the open-end.

10. The method as claimed in claim 9, wherein, in the step (m1), the second UV polymer is OG154 epoxy, the third UV polymer is OG169 epoxy, and the mixing ratio of OG154 epoxy and OG169 epoxy is 1:1.

11. The method as claimed in claim 10, wherein, after cured, the refractive index of the mixed UV epoxy is 1.550 at 1550 nm wavelength.

12. The method as claimed in claim 1, wherein, after step (n), further comprises following steps:

(o) a spacer being placed between the second sample and a thin glass slide to form a second tunnel;

(p) injecting a precure first UV polymer into the second tunnel between the second sample and the glass slide so as to form an upper cladding layer in the second tunnel;

(q) exposing UV light so as to crosslink the cladding layer and the upper cladding layer; and (r) finishing the fabrication of a final polymeric wavelength filter.

13. A polymer wavelength filter with high-resolution periodical structure fabricated by the method as claimed in claim 8, comprising:

a cladding layer having a groove with gratings pattern at its bottom, the cladding layer being made of a first UV polymer; and a core, being formed in the groove of the cladding layer, and being made of a second UV polymer.

14. The polymer wavelength filter as claimed in claim 1, wherein, the first UV polymer is OG146 epoxy, the second UV polymer is a mixed UV polymer which is mixed by OG154 epoxy and OG169 epoxy with the mixing ratio of 1:1.

15. The polymer wavelength filter as claimed in claim 1, wherein, the refractive index of the mixed epoxy is about 1.550 at 1550 nm wavelength.

16. The polymer wavelength filter as claimed in claim 1, further comprises an upper cladding layer for cover the cladding layer and the core, and the upper cladding layer made of a first UV polymer which is the same with the first UV polymer of the cladding layer.

17. The polymer wavelength filter as claimed in claim 16, wherein, the first UV polymer is OG146 epoxy, the second UV polymer is a mixed UV polymer which is mixed by OG154 epoxy and OG169 epoxy with the mixing ratio of 1:1.

18. The polymer wavelength filter as claimed in claim 17, wherein the refractive index of the mixed epoxy is about 1.550 at 1550 nm wavelength.

19. The polymer wavelength filter as claimed in claim 16, wherein the polymer wavelength filter has dimensions of 4 cm in length, 1 cm in width and about 410 μm in thickness.

* * * * *